Patented Oct. 14, 1952

2,614,118

UNITED STATES PATENT OFFICE 2,614,118

STABILIZATION OF MONOMERIC 1,1-DICYANO ETHYLENE

Floyd F. Miller, Akron, Ohio, assignor to The B. F. Goodrich Company, New York, N. Y., a corporation of New York No Drawing. Application August 1, 1949, Serial No. 108,061

4 Claims. (Cl. 260—465.8)

This invention relates to stabilized monomeric 1,1-dicyano ethylene and relates more particularly to the use of liquid aromatic hydrocarbons for inhibiting the polymerization of monomeric 1,1-dicyano ethylene.

In U. S. Patent 2,476,270, to Alan E. Ardis, a method for the preparation of 1,1-dicyano ethylene is disclosed. It is also disclosed therein that 1,1-dicyano ethylene readily undergoes autopolymerization, especially if impurities are present, so that special precautions are desirable in order to obtain 1,1-dicyano ethylene in the monomeric form and to keep it in the monomeric form during periods of storage. Many of the most commonly used stabilizing substances, such as hydroquinone, copper, copper salts, tertiary butyl catechol, phenyl-beta-naphthylamine and the like are unsatisfactory for inhibiting the polymerization of 1,1-dicyano ethylene.

I have now discovered that liquid aromatic hydrocarbons, and especially benzene and toluene, are very excellent stabilizers for monomeric 1,1-dicyano ethylene. The monomer is soluble in liquid aromatic hydrocarbons; hence it is possible to dissolve the monomer in the liquid aromatic hydrocarbon and to store the solution for relatively long periods of time without appreciable polymerization of the monomer occurring. The use of the liquid aromatic hydrocarbons is further advantageous in that these substances form an excellent medium for subsequent polymerization of the monomer. For example, useful polymers of 1,1-dicyano ethylene may be readily prepared simply by adding a polymerization catalyst to the monomer solution whereupon polymer settles out and may be removed by filtering, as is more fully disclosed in the copending application Serial No. 11,336 filed February 26, 1948.

It is highly surprising that the liquid aromatic hydrocarbons act as stabilizers for monomeric 1,1-dicyano ethylene, since other solvents for the monomer, including alcohols and ethers, not only do not act as stabilizers, but actually catalyze the polymerization of the monomer.

The aromatic hydrocarbons which are stabilizers for monomeric 1,1-dicyano ethylene within the scope of this invention are those aromatic hydrocarbons in which all the unsaturation is present in a benzene ring and which are in the liquid state under ordinary conditions, that is, at atmospheric temperatures and pressures, and especially those aromatic hydrocarbons which are in the liquid state at temperatures in excess of 20° C. and at atmospheric pressure. Structurally, the compounds defined above are represented as follows:

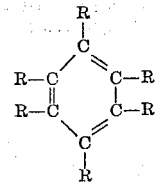

wherein each R is a member of the class consisting of hydrogen and saturated alkyl radicals, preferably containing from 1 to 5 carbon atoms. Included within the class of liquid aromatic hydrocarbons which are useful as stabilizers for 1,1-dicyano ethylene are benzene, toluene, ortho-, meta-, and para-xylenes, 1,2,3-trimethylbenzene, 1,3,5 - trimethylbenzene, 1,2,4 - trimethylbenzene, ethylbenzene, orth-, meta- and para-ethyltoluene, n-propylbenzene, 1,2,3,4 - tetramethylbenzene, 1,2,3,5-tetramethylbenzene, isopropylbenzene, 1,4-diisopropylbenzene, ortho-, meta-, and para-isopropyltoluene and the like. It is to be understood that the stabilizing effect of the above-listed compounds occurs regardless of the method of preparation of the 1,1-dicyano ethylene.

The aromatic hydrocarbon may be present in any desired amount and the quantity utilized is limited only by practical convenience. For example, it has been found that a ratio of about 6 parts by weight of benzene to about 1 part by weight of monomer is conveniently utilized, although a ratio of 1 part or less by weight of benzene to 1 part by weight of monomer may be utilized with generally equivalent results.

The following example illustrates the use of liquid aromatic hydrocarbons as stabilizers for monomeric 1,1-dicyano ethylene according to this invention. In the example all parts are by weight.

Example

Five solutions, each containing 0.3 part of monomeric 1,1-dicyano ethylene dissolved in 3.0 parts of benzene are placed in glass containers and maintained at a temperature of 45° C. The samples are observed daily for 14 days and at the end of this period the solutions are clear, thus indicating that no polymerization of the monomer has occurred. A control sample of monomer of the same degree of purity as that used above, and containing no stabilizer, polymerizes to a non-flowing gel in less than 24 hours, even when maintained at room temperature.

Moreover, when other of the liquid aromatic hydrocarbons listed hereinabove are utilized, the results obtained are in general equivalent or superior to those obtained by the use of benzene. The stabilized compositions may also be stored in plastic, metal or other type container in addition to glass. Furthermore, the samples may be stored at temperatures lower than 45° C. with an increase in the length of time the composition remains stable or at temperatures in excess of 45° C. with but little decrease in the time the composition remains in the monomeric form.

While certain preferred manners of performing the invention have been disclosed, it is not intended to limit the invention thereto, for numerous variations will be apparent to those skilled in the art and are included within the scope of the invention as defined in the appended claims.

I claim:

1. A stabilized composition consisting essentially of monomeric 1,1-dicyano ethylene dissolved in a liquid aromatic hydrocarbon in which all the unsaturation is present in a benzene ring.

2. A stabilized composition consisting essentially of monomeric 1,1-dicyano ethylene dissolved in an aromatic hydrocarbon which is in the liquid state at a temperature in excess of 20° C. and at atmospheric pressure and in which all the unsaturation is present in a benzene ring.

3. A stabilized composition consisting essentially of monomeric 1,1-dicyano ethylene dissolved in benzene.

4. A stabilized composition consisting essentially of 1 part by weight of monomeric 1,1-dicyano ethylene dissolved in from 1 to 6 parts by weight of benzene.

FLOYD F. MILLER.

REFERENCES CITED

The following references are of record in the file of this patent:

UNITED STATES PATENTS

| Number | Name | Date |
| --- | --- | --- |
| 2,212,900 | Groll et al. | Aug. 27, 1940 |
| 2,466,395 | Dickey | Apr. 5, 1949 |
| 2,476,270 | Ardis | July 19, 1949 |